United States Patent [19]
Erlenbusch et al.

[11] 3,779,402
[45] Dec. 18, 1973

[54] AUTOMATIC GATE FOR HAY BALE ACCUMULATOR

[75] Inventors: Gary L. Erlenbusch; Calvin N. Hansen; Richard H. Mott, all of Sioux Falls, S. Dak.

[73] Assignee: Du-Al Manufacturing Company, Sioux Falls, S. Dak.

[22] Filed: Oct. 2, 1972

[21] Appl. No.: 294,027

[52] U.S. Cl. .................................. 214/6 B, 56/475
[51] Int. Cl. ...................... B65g 67/00, B65g 57/20
[58] Field of Search ........................... 214/6 B, 373; 56/475, 476, 473.5

[56] References Cited
UNITED STATES PATENTS
| | | | |
|---|---|---|---|
| 2,736,159 | 2/1956 | Marshall | 56/475 |
| 3,308,971 | 3/1967 | Sinden et al. | 24/6 B |
| 3,443,708 | 5/1969 | Blair | 214/353 |

Primary Examiner—Robert J. Spar
Attorney—Benjamin H. Sherman et al.

[57] ABSTRACT

An automatic gate for a hay bale accumulator which includes a control arm mounted to pivot about a substantially horizontal axis as bales of hay are alternately received in the accumulator until such time that feeler arms attached to the control arm are prevented from rotating about a horizontal axis because the bale accumulator is substantially full. At this time the control arm moves upwardly about a horizontal axis at right angles to the first axis so as to actuate a trip arm to trip the latch of a tailgate so as to allow the bales to be unloaded.

8 Claims, 6 Drawing Figures

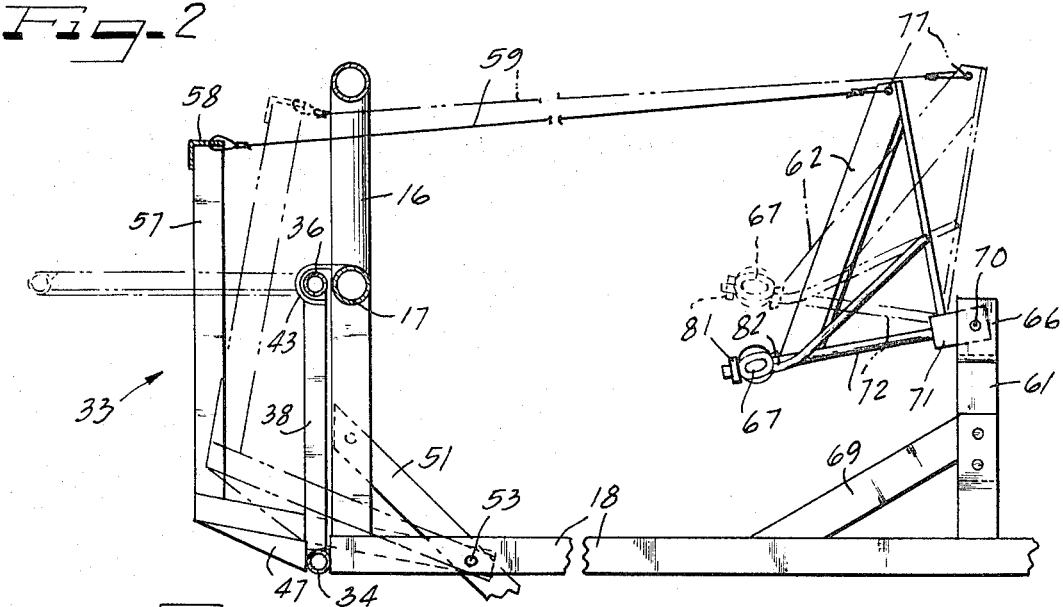
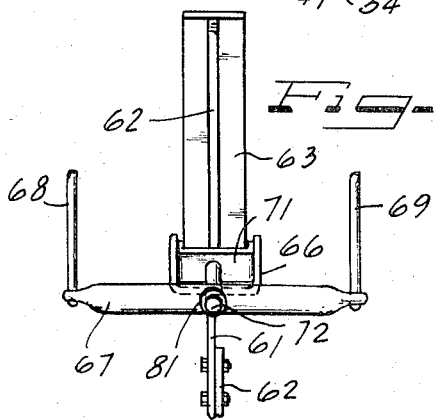
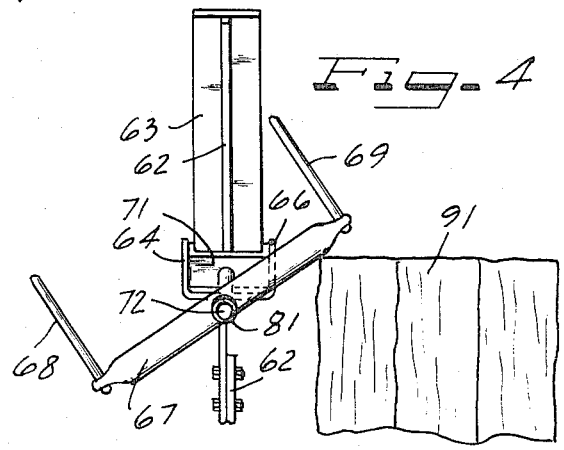
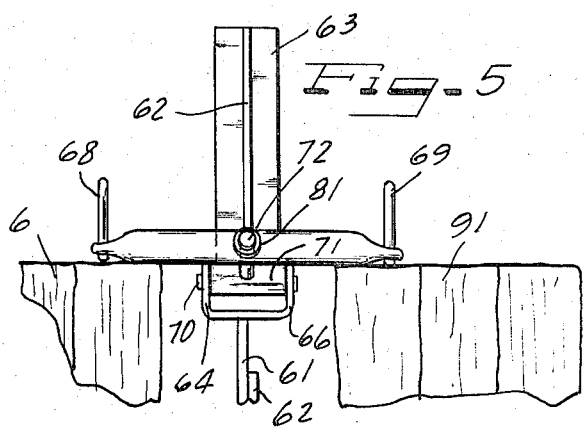
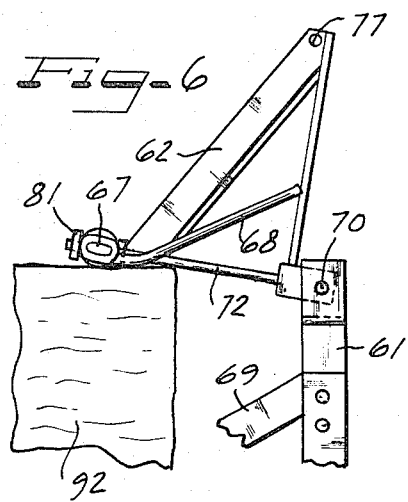

AUTOMATIC GATE FOR HAY BALE ACCUMULATOR

BACKGROUND OF THE INVENTION

1. Field of the invention:

This invention relates in general to hay bale accumulators and in particular to an automatic gate for an accumulator.

2. Description of the Prior Art:

Hay bale accumulators have been known for some time and are used for accumulating bales of hay into piles of a fixed number of units so that they may be easily loaded onto a pickup wagon or truck. The bale accumulators may be drawn by the hay baler so as to receive the bales as they are discharged from the baler and the bales are held by the accumulator until the tailgate of the accumulator is released.

Generally, the tailgate of the accumulator is manually released by pulling a trip rope.

SUMMARY OF THE INVENTION

The present invention relates to an improved hay bale accumulator with an automatic trip gate in which a control arm is rotatably supported on a longitudinal axis which extends generally in the direction of travel of the accumulator and which has a pair of feeler arms for alternately engaging bales of hay in opposite sides of the accumulator. A trip arm is mounted on the longitudinal shaft support and the assembly is supported on a transverse horizontal axis such that when both of the feeler arms of the control arm engage bales of hay, the trip arm rotates on the transverse horizontal axis so as to pull the trip rope and open the gate of the accumulator so that the bales may be discharged and the loading process repeated.

It is an object of the invention to provide a simple trip mechanism which automatically is actuated by the bales when a full load has been accumulated.

BRIEF DESCRIPTION OF THE DRAWINGS

Other objects, features and advantages will be readily apparent from the following description of certain preferred embodiments thereof taken in conjunction with the accompanying drawings, although variations and modifications may be effected without departing from the spirit and scope of the novel concepts of the disclosure, and in which:

FIG. 2 is a sectional view taken on line II-II of FIG. 1;

FIG. 3 illustrates the control arm and trip arm with the control arm in the horizontal position;

FIG. 4 illustrates the control arm and trip arm with the control arm engaging a bale on the right side thereof;

FIG. 5 illustrates the control arm engaging a pair of bales on either side thereof; and FIG. 6 is a side view of the control arm and trip arm under the conditions of FIG. 5.

DESCRIPTION OF THE PREFERRED EMBODIMENTS

Figure 1:
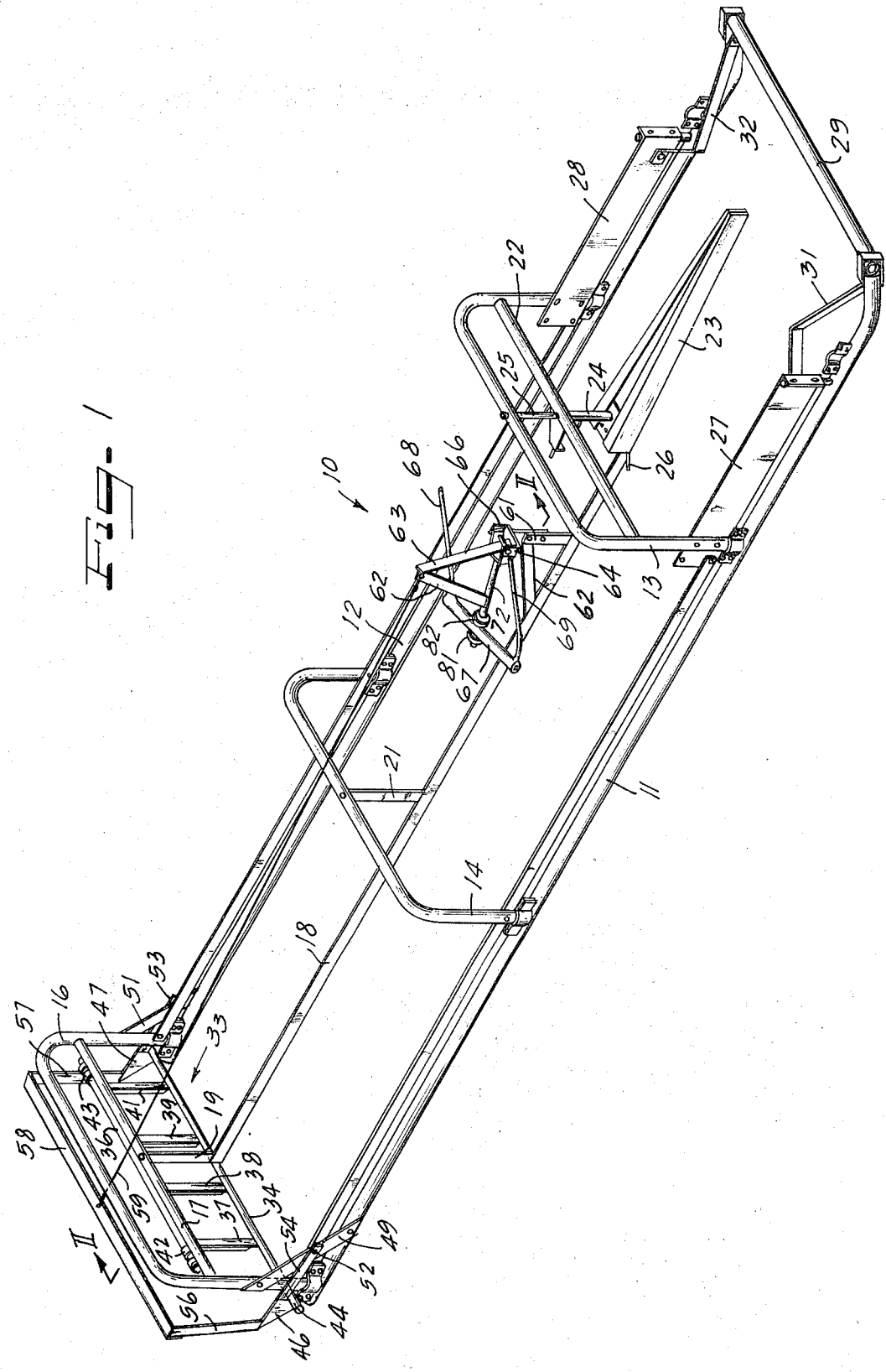
FIG. 1 is a perspective view illustrating the collimatic trip gate of the invention.

FIG. 1 is a perspective view of the bale accumulator of the invention designated generally as 10 and comprises a pair of longitudinally extending sled-runner frame members 11 and 12 which are formed with upwardly extending front portions joined by crossbar 29 over which the bales of hay can pass and which is braced by braces 31 and 32. A plurality of U-shaped cross frame members 13, 14 and 16 have their lower ends attached to the sled runners 11 and 12 and extend upwardly and across with room beneath them so that bales can pass therethrough. A center longitudinal divider member 18 is supported from a crossbar 17 of the frame member 16 by a brace 19 and from the cross member 14 by a brace 21.

A bale director 23 is formed with a hollow sleeve 24 which rotatably fits over a vertical shaft 25 which is supported from the cross member 13 and a crossbar 22 and is formed with ears 26 on either side for engaging bales as they pass therethrough so as to move the bale director from side to side. A suitable over-the-center spring holds the bale director in a position until another bale moves it to the opposite side. Bale holding side panels 27 and 28 are mounted adjacent the bale director on the runners 11 and 12, respectively.

The end gate illustrated in detail in FIG. 2 as well as in FIG. 1 comprises a crossbar 36 which is attached to the crossbar 7 of the frame member 16 by bracket members 42 and 43. Vertical gate frame members 37, 38, 39 and 41 extend downwardly from the cross member 36 and are connected at their lower ends by a cross latch rod 34 for the gate 33. The ends of the latch rod 34 as, for example, end 44 in FIG. 1 extend beyond the sled runners 11 and 12, respectively, and are engageable by a latch member at either end. For example, the latch member 54 is pivotally attached by pin 52 to the sled runner 11 and is formed with a latch portion 46 at its rear end which passes over the end 44 of the gate 33. Likewise, the other end of the gate member 34 is engaged by latch 47 which is pivotally attached by a pin 53 from sled runner 12. A pair of braces 49 and 51 extend between the sled runners 11 and 12 and the cross member 16. A gate latch structure comprises a cross member 58 and a pair of downardly extending links 56 and 57 which are attached to the latches 46 and 47, respectively. A latch rope 59 is attached to the latch gate 58 such that when the latch rope 59 is pulled to the right relative to FIGS. 1 and 2, the latch gate pivots about the pins 52 and 53 thus moving the latches 46 and 47 out of engagement with the ends 44 of the gate member 34 so that the gate is released and can pivot about the hinges 42 and 43 thus allowing the gate to move to the horizontal position as shown in FIG. 2 in dotted line so that the bales in the accumulator are discharged.

The automatic trip mechanism of this invention comprises a control arm 67 and a trip arm.

The center longitudinal frame member 18 has an upright support member 61 and a brace member 62 which extends from the member 18 to the support 61. A U-shaped bracket comprising the uprights 64 and 66 are attached to the upper end and of the upright 61 and a transverse horizontal pin 70 extends through the arms 64 and 66 and through a U-shaped member 71. A shaft 72 extends from the U-shaped member 71 and rotatably supports a control arm 67 which extends generally transverse of the bale accumulator at its end remote from the pivot pin 70. A washer 82 is mounted on one side of the control arm 67 and a washer 81 is mounted on the other side of the control arm 67 such that the control arm 67 is free to pivot about the shaft 72. A pair of bale-engaging fingers 68 and 69 are attached to opposite ends of the control arm 67 and extend generally upwardly so that they can control the position of the arm 67 in response to engagement by bales as they pass through the accumulator.

A pair of inverted V-shaped links 62 and 63 have their lower ends connected to the shaft 72 and their upper ends are joined together. An opening 77 is formed through the link 62 and the trip rope 59 is connected through the hole 77.

In operation, assuming that the gate 33 is closed with the latches 46 and 47 in engagement with the portions 44 of the shaft 34 of the gate and assume that the bale director directs a first bale between the sled runner 11 and the frame member 18, this bale 91 as illustrated in FIG. 4 will engage the feeler 69 of the control arm 67 to cause it to pivot on the shaft 72 to the position shown in FIG. 4. The bale 91 then will pass to the rear of the control arm 67 out of engagement with the control arm and against the gate 33 which will be held closed by the latches 46 and 47 as the accumulator continues to move over the ground. The next bale will be directed by the bale director 23 between the frame member 18 and the sled runner 12 and the control arm 67 will be pivoted upwardly about the shaft 72 by the bale passing through the member 18 and the sled runner 12. However, since no bale is under the feeler finger 69 at the same time that the feeler finger 68 engages the second bale, the control arm 67 can pivot downwardly between the member 18 and sled runner 11 to allow the bale to pass against the end gate 33.

In the particular design, the accumulator is designed for grouping eight bales and when the fourth bale passes into the channel between the member 18 and sled runner 11, it will remain under the control arm 67 and the feeler arm 69 holding it in the position illustrated in FIG. 4. Then when the eighth bale is received and directed by the bale director 23 into the channel between the member 18 and the sled runner 12, it will engage the feeler arm 68 and at this time since the bale 91 beneath the feeler arm 69 is still in engagement with the arm 67 rather than causing the arm 67 to move upwardly pivoting about the shaft 72, the trip arm assembly will pivot about the shaft 70 thus causing the trip rope 59 to be pulled moving the gate latch 58 and the latches 46 and 47 out of engagement with the rod 34 so that the gate 33 can pivot upwardly to the position illustrated in dotted line in FIG. 2, thus allowing the eight bales to pass out of the accumulator. As soon as the gate 33 opens the bales will remain stationary relative to the ground and the bales under the gate 33 will hold the gate open so that all eight of the bales will move out of the accumulator. As soon as the seventh and eighth bales have cleared the gate, the gate will return by gravity to the closed position and the gate latch will lock the member 34 by the latches 46 and 47 passing into locking relationship as shown in FIGS. 1 and 2.

FIG. 6 is a side view of the trip arm in the released position wherein the seventh and eighth bales have caused the trip arm to pivot about the shaft 70 thus releasing the end gate 33.

Thus, the present invention provides an automatic gate release for a bale accumulator which is actuated only when the bale accumulator has been filled to its designed capacity after which the gate is automatically released and the bales are allowed to pass out of the accumulator at which time the gate again locks automatically for the accumulation of additional bales.

Although the invention has been described with respect to preferred embodiments, it is not to be so limited as changes and modifications may be made which are within the full intended scope as defined by the appended claims.

What we claim is:

1. A bale accumulator movable over the ground for receiving bales and aligning them into two side by side rows and periodically automatically releasing them when the accumulator is full;
   an end gate attached to the rear end of said accumulator to hold the bales;
   a gate latch means for locking said end gate in the closed position;
   means for sensing bales and actuating said gate latch means when said accumulator is full of bales mounted between said rows of bales on said accumulator, and wherein said sensing and actuating means comprises:
   a trip arm assembly connected to said gate latch means and pivotally attached to said accumulator on an axis transverse to said accumulator;
   a control arm pivotally attached to said trip arm assembly on an axis longitudinal to said accumulator and mounted such that bales received in one side of said accumulator engage one end to pivot it about said longitudinal axis to move said one end upwardly out of the path of said bale unless the other end of said control arm simultaneously engages a bale in the second side wherein said trip arm assembly is pivoted upwardly about the transverse axis to release said gate latch means.

2. A bale accumulator according to claim 1 including a pair of feeler arms respectively attached to opposite ends of said control arm and extending upwardly and forwardly of said accumulator to engage bales.

3. A bale accumulator according to claim 1 wherein said trip arm assembly is attached to said gate latch means by a trip line.

4. A bale accumulator according to claim 1 including a center frame portion of said accumulator which supports said trip arm assembly.

5. A bale accumulator according to claim 4 wherein said trip arm assembly includes a horizontal shaft with one end attached to said accumulator by a transverse shaft extending through said transverse axis and said control arm pivotally attached near its center to the other end of said horizontal shaft.

6. A bale accumulator according to claim 5 wherein said trip arm assembly further includes a trip arm attached to said horizontal shaft and a trip line extending from said gate latch means to said trip arm.

7. A bale accumulator according to claim 6 wherein said horizontal shaft is formed with a bifurcated end through which said transverse shaft extends.

8. A bale accumulator according to claim 1 including a bale director for alternately directing bales into said rows.

* * * * *